United States Patent [19]

Nishida et al.

[11] Patent Number: 4,504,020
[45] Date of Patent: Mar. 12, 1985

[54] PULVERIZING MILL APPARATUS

[75] Inventors: Toyomi Nishida; Takeshi Suzuki, both of Kobe; Takashi Hatamori, Miki; Sei Terada, Kobe, all of Japan

[73] Assignee: Kawasaki Jukogyo Kabushiki Kaisha, Kobe, Japan

[21] Appl. No.: 389,145

[22] Filed: Jun. 16, 1982

[30] Foreign Application Priority Data

Jun. 20, 1981 [JP] Japan .................................. 56-95580
Jun. 27, 1981 [JP] Japan .................................. 56-99886

[51] Int. Cl.³ .............................................. B02C 17/02
[52] U.S. Cl. ................................ 241/121; 241/152 A; 241/176; 241/179; 241/261.1
[58] Field of Search ...................... 241/57, 73, 74, 176, 241/177, 179, 178, 181, 182, 183, 153, 152 A, 207–216, 261.1, 97, 121, 60, 61, 80

[56] References Cited

U.S. PATENT DOCUMENTS 862,720   8/1907  Day ............................ 241/152 A
1,605,025 11/1926 Hildebrandt .................. 241/176 X
2,019,061 10/1935 Thiex .......................... 241/74
3,172,609  3/1965 Olsen et al. ................. 241/74 X Primary Examiner—Mark Rosenbaum
Attorney, Agent, or Firm—Jordan and Hamburg

[57] ABSTRACT

Solid particulate material such as cement raw material, clinker, etc., is finely ground, crushed or pulverized, by means of a rotatable generally vertically oriented container of generally inverted frusto-conical shape, and having grinding media such as steel balls disposed therein. The discrete particles of the material to be pulverized are fed into the upper part of the container as it is rotated about a central vertical axis, and egress of the resulting finely ground material by centrifugal force from the container to external collection is accomplished by the provision of slits in the inclined side wall of the rotary container. A fixed cover enclosing the upper part of the container is provided with inner guide vanes which are typically curved or of a vortical form. A preliminary coarse crushing mechanism may be provided, and this mechanism may be integrated with the rotary container, so that coarse crushing and fine crushing may be performed by a single device.

18 Claims, 12 Drawing Figures

PULVERIZING MILL APPARATUS

BACKGROUND OF THE INVENTION

1. Field of the Invention

This invention relates to a ball mill of the vertical conical shape for pulverizing cement raw material, clinker, etc. 2. Description of the Prior Art FIG. 1 shows a vertical conical ball mill of the prior art comprising a rotary container 1 of a substantially inverted frustoconical shape, and a fixed cover 2 arranged in a manner to enclose an upper portion of the rotary container 1. The rotary container 1 contains therein a multiplicity of grinding media 3 which have centrifugal forces exerted thereon as the rotary container 1 rotates, and which ascend along a side wall 1a of the rotary container 1 until they reach the fixed cover 2, where the grinding media 3 are moved inwardly by forces of inertia along guide vanes 4 on an inner surface of the fixed cover 2, and descend to pulverize material 6 in the rotary container 1 fed through a material feeding chute 5 located in an upper portion of the fixed cover 2.

The pulverizing mill apparatus of the aforesaid construction is operative to discharge the pulverized material 6 from the apparatus by means of air currents through a duct 8 connected to a central portion of the fixed cover 2. To allow the rotary container 1 to rotate, it is necessary to provide a gap 9 between the rotary container 1 and the fixed cover 2. However, to keep the pulverized material 6 from being discharged from the apparatus through the gap 9 and scattered to the outside, it is essential that the gap 9 be minimized.

Centrifugal forces of high magnitude are exerted on the pulverized material 6 in the vicinity of the gap 9 to urge the material 6 to fly out of the apparatus. Thus the conical pulverizing mill apparatus of the prior art suffers the disadvantage that continuous operation cannot be performed in a stable manner due to deposition of the particles of pulverized material 6 on the parts of the container 1 and cover 2 facing the gap 9 and blocking of the gap 9 by broken pieces of the steel balls which are grinding media 3 or other foreign matter.

To discharge the particles of pulverized material 6 by means of the air currents 7 in a direction oriented upwardly from the apparatus requires the use of a blower of a large capacity and high pressure capable of developing a large volume of air currents. This is not desirable from the point of view of energy saving.

This type of pulverizing mill apparatus is suitable for use in obtaining pulverization to material of a particle size of below several millimeters in such a manner that the residual portion of the material is about 1% residue on a sieve of 88μ and about 10% residue on a sieve of 44μ. However, the apparatus is not suitable for coarsely crushing of coarse material of several tens of millimeters or of up to one hundred and several tens of millimeters in particle size to a particle size of 3-4 mm.

A tube mill having two to three chambers is available as a ball mill performing coarse crushing and pulverizing in a single device. This device only relies on impact crushing by the circulatory behavior of steel balls which are crushing media, so that it is very low in pulverizing efficiency.

SUMMARY OF THE INVENTION

Purpose of the Invention

This invention has been developed for the purpose of obviating the aforesaid problems of the prior art. Accordingly the invention has as one of its objects the provision of a ball mill apparatus of the conical shape and having the gap between the rotary container and the fixed cover, which is enlarged in size as compared with that of a similar apparatus of the prior art, and which is capable of discharging the pulverized material from the mill to outside with a lower power consumption than has hitherto been used.

The aforesaid object is accomplished according to the invention by providing, in a pulverizing mill apparatus formed with a gap between the rotary container and the fixed cover which is of a size smaller than the pulverizing medium but greater than the pulverized material, slits located at an inclined side wall of the rotary container, for discharging the pulverized material therethrough from the mill to outside, with a casing enclosing the rotary container and the fixed cover, and with means for conveying material pulverized material from between the side wall of the rotary container and the casing.

In the invention, the disadvantages involving the gap between the rotary container and the fixed cover that have hitherto raised problems in the pulverizing mills of the prior art are eliminated, and the powdery dust can be kept from being scattered to outside from the mill. Also, the power required for discharging the pulverized material is reduced contributing to saving of energy, and the dynamic effect of the grinding media which is an important characteristic of the vertical conical mill can be kept at a high level. This is conducive to reducing power requirements for driving the rotary container, and obtaining an overall compact size in the pulverizing apparatus as a whole, thus enabling compound pulverization utilizing a force of impact and a force of friction suiting the degree of pulverization to be effected.

Another object of the invention is to provide a pulverizing mill apparatus wherein a ball mill of the conical shape is provided with integral separate crushing means suitable for performing coarse crushing, both mounted as a single device of compact size, power being supplied to both the pulverizing and coarse crushing means concomitantly, to reduce power consumption and avoid scattering of powdery dust.

These and other objects and advantages of the present invention will become evident from the description which follows.

BRIEF DESCRIPTION OF THE INVENTION

In the present invention, solid particulate material such as cement raw material, clinker, etc., is finely ground, crushed or pulverized, by means of a rotatable generally vertically oriented container of generally inverted frusto-conical shape, and having grinding media such as steel balls disposed therein. The discrete particles of the material to be pulverized are fed into the upper part of the container as it is rotated about a central vertical axis, and egress of the resulting finely ground material by centrifugal force from the container to external collection is accomplished by the provision of slits in the inclined side wall of the rotary container. A fixed cover enclosing the upper part of the container is provided with inner guide vanes which are typically curved or of a vortical form. A preliminary coarse crushing mechanism may be provided, and this mechanism may be integrated with the rotary container, so that coarse crushing and fine crushing may be performed by a single device.

The aforesaid objects are accomplished according to the invention by providing, in a pulverizing mill apparatus, an annular container of the substantially inverted frustoconical shape in cross section arranged at the outer periphery of a base rotatable with a vertical rotary shaft and formed with slits at an inclined side wall surface thereof, a fixed cover secured to a machine frame and located in a manner to enclose the upper portion of the annular container, the fixed cover having guide vanes attached to its inner surface, conical pulverizing means performing pulverization by the circulating behavior of a grinding media, coarse crushing means located on the base, and a casing secured to the machine frame in a manner so as to enclose the pulverizing and coarse crushing means.

As described hereinabove, the pulverizing mill apparatus according to the invention comprises an annular container of substantially inverted frustoconical shape in cross section arranged at the outer periphery of the base and rotatable with the vertical rotary shaft, and formed with slits at the inclined side wall surface thereof, a fixed cover secured to the machine frame and located in a manner so as to enclose the upper portion of the annular container, the fixed cover having guide vanes attached to its inner surface, conical pulverizing means performing pulverization by the circulatory behavior of a grinding media, coarse crushing means located on the base, and a casing secured to the machine frame in a manner to enclose the pulverizing and coarse crushing means. The apparatus enables successive coarse crushing and pulverizing of material of a particle size ranging from between several tens to one hundred and several tens of millimeters to be achieved efficiently by a single drive means in the same apparatus, and allows discharge of pulverized material to be effected without requiring air currents of high pressure and large volume, as has been the case in mills of the prior art, thereby achieving energy saving. The provision of the casing enclosing the pulverizing and coarse crushing means is conducive to prevention of scattering of powdery dust to the outside from the apparatus.

The invention accordingly consists in the pulverizing mill apparatus as described supra and as will be elucidated infra and shown in the drawings, and as claimed in the appended claims.

DETAILED DESCRIPTION OF THE PREFERRED EMBODIMENTS

Preferred embodiments of the invention will be described by referring to the accompanying drawings.

Figure 2:
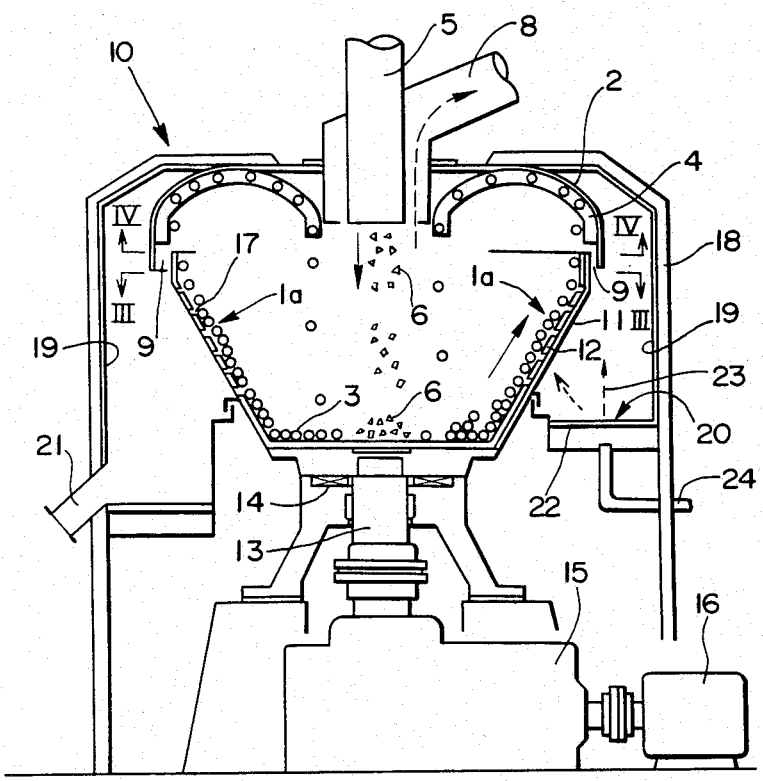
FIG. 2 is a sectional elevation view of the pulverizing mill apparatus in its entirety and comprising one embodiment of the present invention.

FIG. 2 shows one embodiment in which a pulverizing mill apparatus generally designated by the reference numeral 10 is shown in its entirety in a cross sectional view. The pulverizing mill apparatus 10 comprises a rotary container 1 of a substantially inverted frustoconical shape including a container frame 11 and a liner 12 applied to its inner surface. The rotary container 1 has located therein grinding media 3 which may be steel balls, cylpebs formed of steel, etc., and also has secured to the underside of its bottom a bearing 14 supporting a vertical rotary shaft 13 connected through a speed reducing mechanism 15 to an electric motor 16 for rotation.

Figure 1:
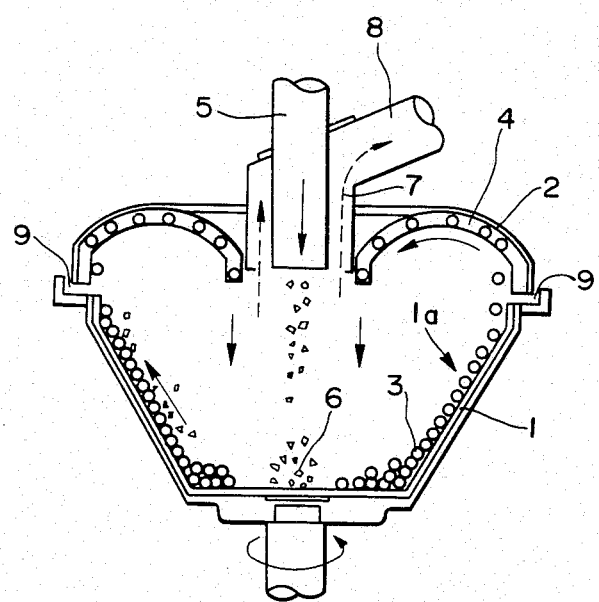
FIG. 1 is a sectional elevation view of the essential portions of a conical ball mill of the prior art.
Figure 3:
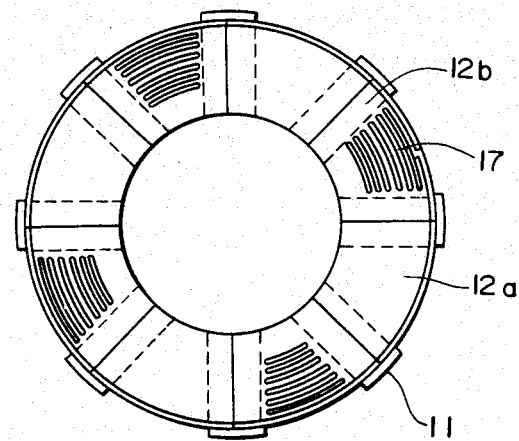
FIG. 3 is a sectional plan view as seen in the direction of arrows III—III in FIG. 2.

A plurality of slits 17 shown in FIG. 3 are formed in the liner 12 at an inclined wall 1a which may be either a straight line or curved in a vertical plane at its inclined surface.

Located above the rotary container 1 is a fixed cover 2 secured to a machine frame 18 and spaced apart from the rotary container by a gap 9 axially and radially, if necessary. The gap 9, which need not be small in size to maintain an airtight seal to the interior of the rotary container 1, is dimensioned in such a manner that the grinding media 3 are prevented from flying out of the container 1 through the gap 9.

Figure 4:
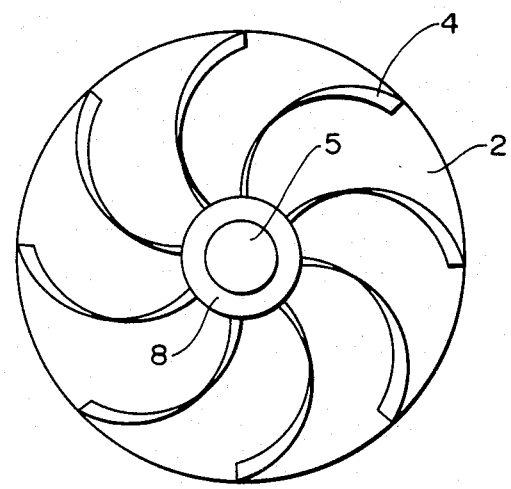
FIG. 4 is a sectional plan view as seen in the direction of arrows IV—IV in FIG. 2.

As shown in FIG. 4, the fixed cover 2 has guide vanes 4 of a vortical form attached thereto. A chute 5 for feeding material 6 to be pulverized, and a duct 8 for drawing air arranged on the outer periphery of the chute 5, are located in the central portion of the fixed cover 2.

A casing 19 enclosing the rotary container 1 and the fixed cover 2 is supported by the machine frame 18 to separate the vertical conical mill apparatus from the outside atmosphere. In the embodiment shown in FIG. 2, a fluidizing conveyor 20 is mounted between the casing 19 and the rotary container 1 in an annular form and in an inclined position and has a chute 21 connected to its lowermost end, the chute 21 extending through the casing 19.

Operation of the pulverizing mill apparatus shown in FIGS. 2, 3 and 4, and described hereinabove, will now be described.

When the rotary container 1 having a charge of the grinding media 3 contained therein is rotated by the electric motor 16, the grinding media 3 are caused to move upwardly along the inclined side wall 1a of the rotary container 1 by centrifugal forces. When they reach the upper end of the inclined side wall 1a, they abut against the fixed cover 2 enclosing the rotary container 1, due to forces of inertia possessed thereby, and move to the central portion of the fixed cover 2 as guided by the plurality of guide vanes 4 attached to the fixed cover 2. From the central portion of the fixed cover 2, the grinding media 3 separate themselves from the guide vanes 4 and drop down onto the rotary container 1. The particles of material 6 to be pulverized are fed through the chute 5 in the central portion of the fixed cover 2 to the rotary container 1, and are impacted by the grinding media 3 dropping from the guide vanes 4 as aforesaid, moving in circulating movement. After being crushed by the grinding media 3 by impact therewith, the material 6 moves together with the grinding media 3 along the inclined side wall 1a of the rotary container 1, and the material is crushed by friction as it is held between the grinding media 3 and the inclined side wall 1a, or between grinding media 3.

The material 6 to be pulverized also moves upwardly along the inclined side wall 1a of the rotary container 1 together with the grinding media 3. As described hereinabove, the inclined side wall 1a is formed with the slits 17, so that the material 6 that has been crushed and now has a particle size small enough to pass through the slits 17 is discharged by centrifugal forces through the slits 17 and from the rotary container 1 to outside. Those particles of the material 6 that have been crushed and reach the upper end of the inclined side wall 1a and do not have forces of inertia great enough to carry the material 6 upwardly to the fixed cover 2, are discharged through the gap 9 from the rotary container 1 to outside.

The particles of crushed material 6 discharged from the rotary container 1 as aforesaid drop down onto the fluidizing conveyor 20 located at the outer periphery of the rotary container 1, where the crushed material 6 is fluidized by an air current 23, which is passed through a canvas member 22 after being fed under pressure through a fluid passage 24 by a blower, not shown. The fluidized particles of crushed material 6 are successively conveyed to the lower end portion of the fluidizing conveyor 20 and discharged through the chute 21 to outside from the rotary container 1. It is to be understood, however, that the conveyor means located between the rotary container 1 and casing 19 is not limited to the fluidizing conveyor, and may be in the form of a known scraper. When the aforesaid fluidizing conveyor 20 is used, the interior of the pulverizing mill apparatus enclosed by the rotary container 1 and fixed cover 2, and the space defined by the casing 19 and fluidizing conveyor 20, can be kept at a subatmospheric pressure, if the air inside the apparatus is drawn through the duct 8, when duct 8 is connected to a dust collecting machine or an induced draft fan, not shown, thereby keeping the powdery dust from being scattered from the mill apparatus to outside. The small amount of particles of crushed material 6 ejected through the duct 8 by an air current are collected by the dust collecting machine. A clearance of a size large enough to allow the rotary container 1 to rotate without any difficulty has to be provided solely between the rotary container 1 and the fluidizing conveyor 20.

The slits 17 formed at the inclined side wall 1a of the rotary container 1 may have any size as desired, as long as the shape is suitable to permit the crushed material 6 to be ejected therethrough from the milling apparatus to outside. FIG. 3 shows arcuate slits. The slits may be formed over the entire surface of the inclined side wall 1a, but they may, as shown in FIG. 3, be formed such that a liner 12a having no slits and a liner 12b having slits are alternately disposed at side wall 1a. In this case, the grinding media 3 can move smoothly upwardly along the liner 12a having no slits, with good results.

Figure 5:
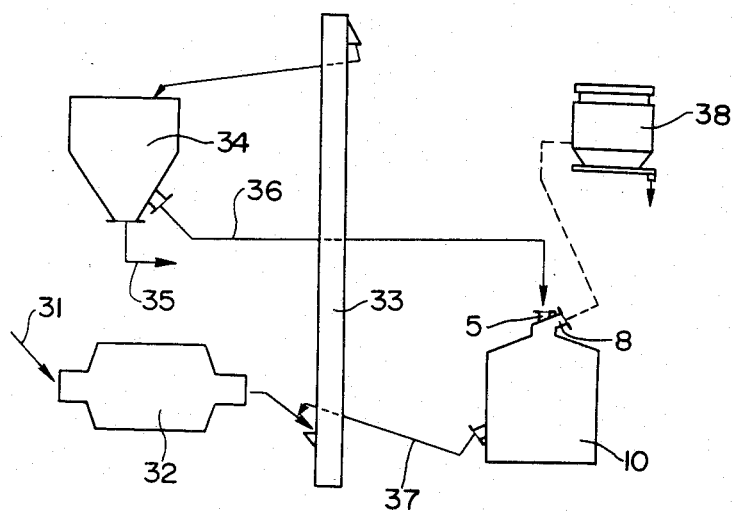
FIGS. 5 and 6 are flowsheet views in explanation of a plant having the pulverizing mill apparatus according to the present invention incorporated therein.
Figure 6:
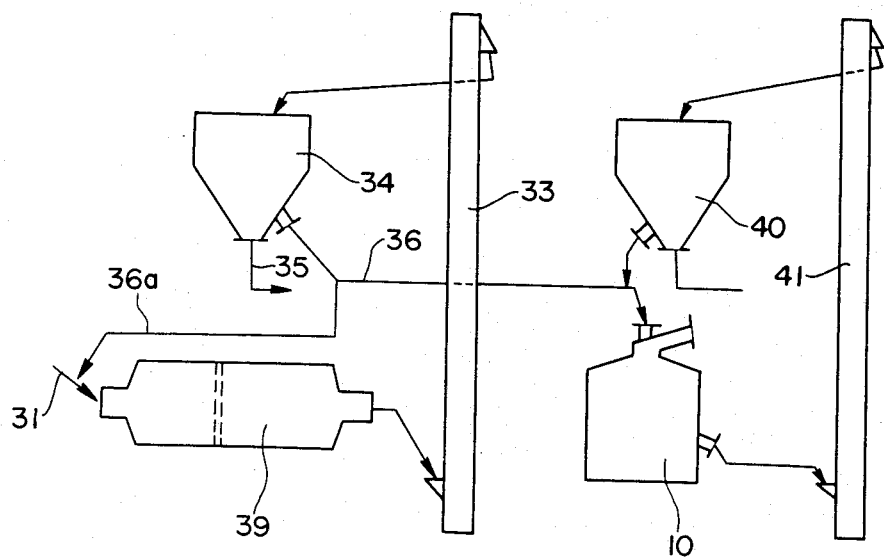

FIGS. 5 and 6 show flowsheet examples of a grinding plant having incorporated therein the aforesaid embodiment. In FIG. 5, particles of material to be pulverized are fed through a chute 31 and are coarsely crushed by a single chamber tube mill 32, and are then conveyed by an elevator 33 to a separator 34, where the coarsely crushed particles of material 6 are classified by the separator, and fine particles are passed through a chute 35 to the next station, and coarse particles are transported through a chute 36 and fed through the chute 5 to a conical mill, which is the pulverizing mill apparatus 10 according to the invention.

The particles of pulverized material 6 discharged from the pulverizing mill apparatus 10 are fed through a chute 37 to the elevator 33 again to be classified as described hereinabove. The air drawn through the duct 8 is released to atmosphere after having powdery dust contained therein removed by a dust collector 38. The powdery dust obtained via the dust collector 38 may be fed to the next station, together with the fine particles fed through the chute 35 to the next station, as aforesaid.

By this arrangement, the operation of crushing the material 6 into coarse particles can be performed efficiently in the tube mill 32, where the force of impact is predominant, and the operation of crushing the coarse particles can be performed by the pulverizing mill apparatus 10 according to the invention, in which the force of friction is predominant, after fine particles are separated from the coarse particles obtained by the operation in the tube mill 32, whereby the crushing efficiency of the system as a whole can be improved.

FIG. 6 shows another example of an installation in which the present invention is incorporated, in which the pulverizing mill apparatus 10 according to the invention is combined with a two chamber tube mill 39. This example is distinct from the example shown in FIG. 5 in that part of the powder returned from the separator 34 is returned to the material feeding chute 31 through a return chute 36a, and that there are additionally provided another separator 40 for classifying particles of dust discharged from the conical mill, which is the pulverizing mill apparatus 10 according to the invention, and an elevator 41 for conveying the dust thereto. By this arrangement, it is possible to maintain the amount of material 6 to be crushed and which is held inside the two chamber tube mill 39 at an optimum level for producing fine particles, and it is also possible to relatively easily provide improvements to the already installed tube mill 39 and separator 34, when the need arises to improve their efficiency.

Figure 7:
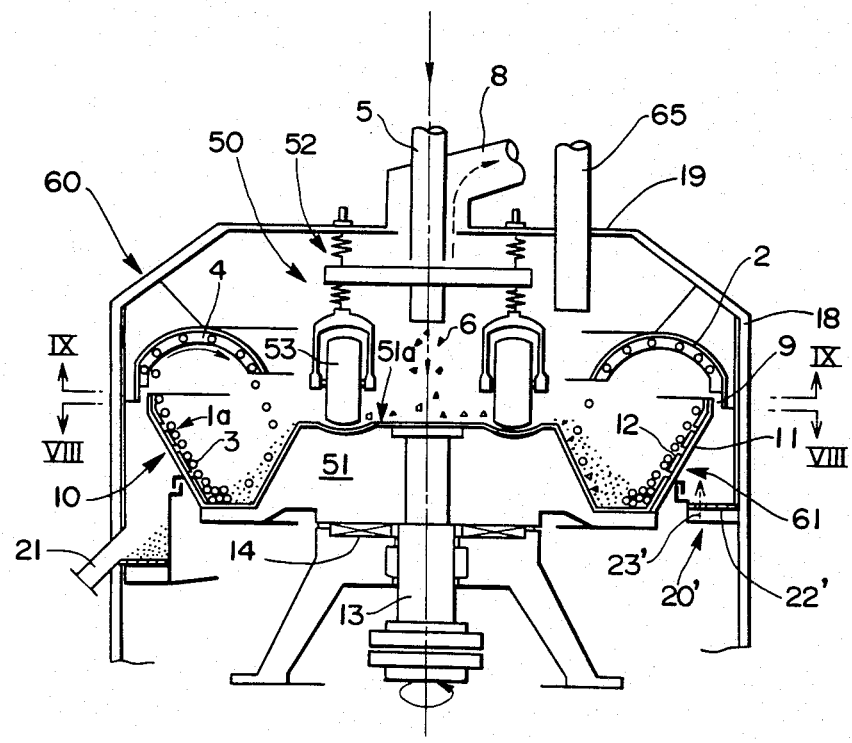
FIG. 7 is a sectional elevation view of the present pulverizing mill apparatus and comprising another embodiment.

FIG. 7 shows in cross section a pulverizing mill system 60 wherein a conical mill, which is the pulverizing mill apparatus 10 according to the invention, is combined with a vertical roller mill 50 employed for obtaining coarse particles by crushing.

An annular container 61 of the inverted frustoconical shape in cross section including a container frame 11 and a liner 12, which is applied to the inner surface of the container frame 11, is located at the outer periphery of a base 51, and contains therein grinding media 3 (steel balls, cylpebs, etc.) charged beforehand. The rotary shaft 13 secured to the undersurface of the base 51 and located perpendicular thereto is supported by the bearing 14 and driven for rotation by an electric motor through a speed reducing mechanism, not shown. The liner 12 is formed with the slits 17 shown in FIG. 8.

Located above the annular container 61 and spaced apart therefrom by the gap 9 is the fixed cover 2 secured to the machine frame 18, the gap 9 being of a size such that the grinding media 3 are prevented from flying out of the container 61 therethrough.

Figure 9:
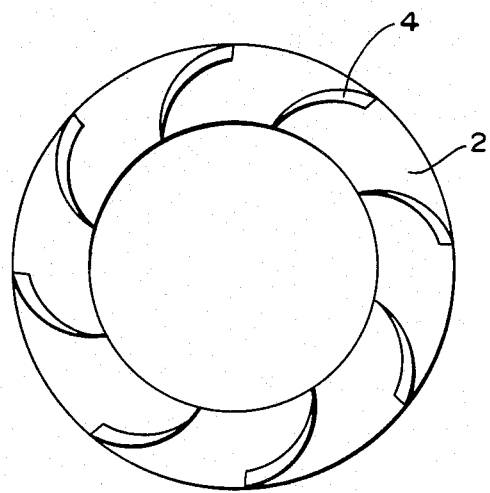
FIG. 9 is a sectional plan view as seen in the direction of arrows IX—IX in FIG. 7, showing the arrangement of the guide vanes attached to the inner surface of the fixed cover.

The fixed cover 2 has attached to its inner surface the guide vanes 4 of vortical form as shown in FIG. 9.

The base 51 includes an upper surface 51a serving as a crushing tray of the vertical roller mill 50. Rollers 53 are held at the periphery of the upper surface 51a of the base 51 by resilient support means 52 and are supported in a manner to be pressed by the upper surface 51a.

The chute 5 for feeding the particles of material 6 to be pulverized, and the duct 8 for drawing air located at the outer periphery of the chute 5, are arranged above the center of the base 51. In addition, the casing 19 enclosing the vertical conical mill 10 and the vertical roller mill 50 is attached to the machine frame 18, to prevent the crushing means 10 and 50 from being exposed to atmosphere. Located between the casing 19 and the annular container 61, and mounted annularly in an inclined position, is a fluidizing conveyor 20' having the chute 21 connected to its lowermost position.

Figure 8:
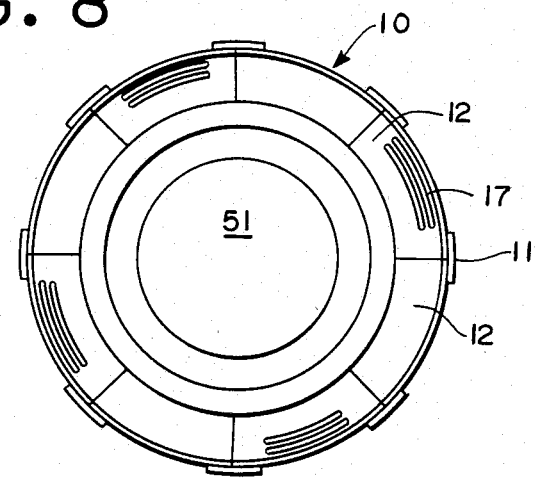
FIG. 8 is a sectional plan view as seen in the direction of arrows VIII—VIII in FIG. 7, showing the arrangement of the slits formed at and in the side wall of the annular container.

Operation of the embodiment of the invention shown in FIGS. 7, 8 and 9, and described hereinabove, will now be described. Particles of material 6 to be pulverized, and ranging from several tens to one hundred and several tens of millimeters in size are fed through the chute 5 and drop onto the base 51, which is rotating in a horizontal plane by means of the rotary shaft 13. The material 6 is moved radially of the base 51 by centrifugal forces as the base 51 rotates, and is bitten by the rollers 53 located in the vicinity of the outer periphery of the base 51 and the upper surface 51a of the base 51, so as to be coarsely crushed. At this time, the rollers 53 only move by being pulled by the rotation of the base 51, but the final coarse crushing of the material 6 can be attained because of the pressure applied by the resilient support means 52 to the rollers 53.

The material 6 thus coarsely crushed moves to the outer periphery of the base plate 51 and it reaches the annular container 61 of the vertical conical mill 10 described hereinabove.

The annular container 61 is formed as a unit with the base 51, and rotates in a horizontal plane at all times, to cause the members of the pulverizing media 3 charged beforehand in the container 61 to move along the inclined side wall 1a. Upon reaching the upper end of the inclined side wall 1a, the grinding media 3 abuts against the fixed cover 2 enclosing the upper portion of the annular container 61, due to forces of inertia possessed by the media 3. The grinding media 3 are guided by the plurality of guide vanes 4 attached to the fixed cover 2 and move inwardly. After being released from the guide vanes 4, the grinding media 3 drop into the annular container 61.

The coarse particles of material 6 delivered from the vertical roller mill 50, which is a coarse crushing means, are pulverized by the force of impact exerted thereon by the grinding media 3 moving in circulating movement, as the latter are released from the guide vanes 4 and drop into the annular container 61. Then the pulverized particles of material 6 are further crushed by the force of friction, as they are held between the media 3 and the inclined side wall 1a, or between the grinding media 3, when they move along the inclined side wall 1a of the annular container 61 with the grinding media 3.

The crushed material 6 also moves upwardly along the inclined side wall 1a of the annular container 61, together with the members of the grinding media 3. Since the slits 17 are formed at the side wall 1a as described hereinabove, the pulverized material 6 is ejected by centrifugal forces out of the annular container 61. The pulverized material 6 reaching the upper end of the side wall 1a are discharged from the mill to outside through the gap 9 when they have no forces of inertia of a magnitude great enough to send them to the fixed cover 2. Depending on the characteristics of the material 6 to be crushed, the need to provide the slits 17 may be eliminated and the pulverized particles of material 6 may be discharged solely through the gap 9.

The pulverized particles of material 6 discharged from the mill as aforesaid drop onto the fluidizing conveyor 20' arranged at the outer periphery of the annular container 61, and move under pressure generated by a blower, not shown, to be fluidized by air 23' flowing through the canvas member 22', so that the fluidized particles of material 6 are successively conveyed to the lower end portion of the fluidizing conveyor 20' and discharged out of the mill via the chute 21. The conveyor means between the annular container 61 and the casing 19 is not limited to the fluidizing conveyor 20' shown and described hereinabove, and a known scraper may replace it. The duct 8 is connected to a dust collecting machine or an induced draft fan, not shown. As the air in the apparatus is drawn through the duct 8, the space defined by the annular container 61 and the casing 19, and the space defined by the casing 19 and the fluidizing conveyor 20', can be kept at a subatmospheric pressure, to prevent powdery dust from being scattered out of the apparatus. A small amount of pulverized material 6 discharged by an air current through the duct 8 can be collected by the dust collector.

In FIG. 7, a third embodiment of the coarse crushing means is shown as the vertical roller mill 50 with tire type roller 53. However, the invention is not limited to this specific form of third embodiment and it may be replaced by a roller mill with conical type roller.

Figure 10:
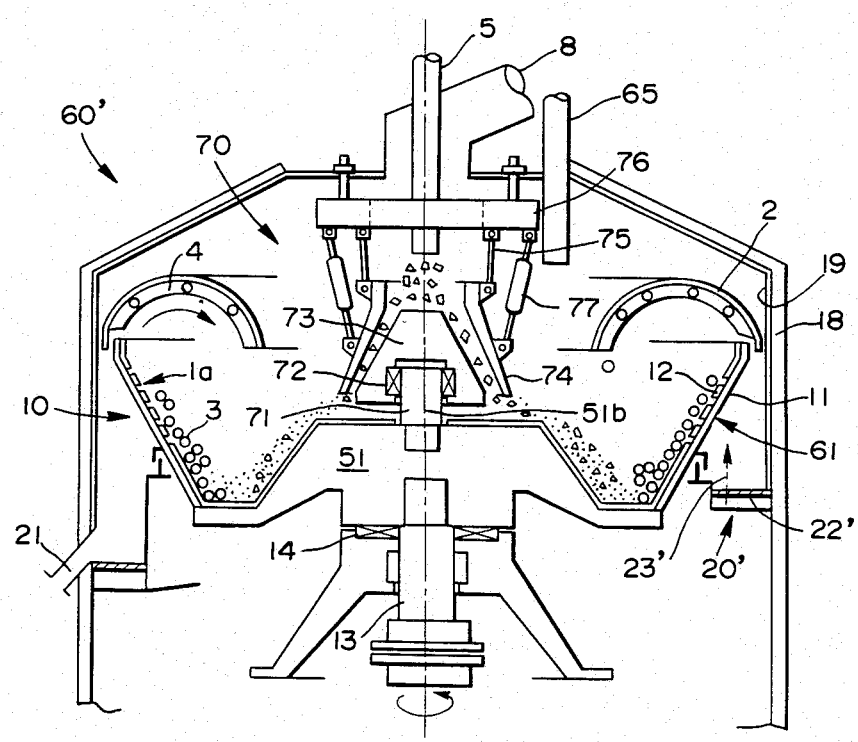
FIG. 10 is a sectional elevation view of the present pulverizing mill apparatus and comprising still another embodiment.

FIG. 10 is a sectional elevation view of a pulverizing apparatus 60' comprising in combination the conical mill which is the pulverizing mill apparatus according to the invention and a cone crusher 70, which is a coarse crushing means. The embodiment shown in FIG. 10 is distinct from the embodiment shown in FIG. 7 in that the cone crusher 70 is used as a coarse crushing means in place of the vertical roller mill. Parts shown in FIG. 10 similar to those shown in FIG. 7 will be designated by like reference characters and their description shall be omitted.

A mantle 73 is rotatably supported through a bearing 72 by a vertical shaft 71 secured in an eccentric position to the center axis of the base 51, and a cone cape 74 is arranged in a manner to surround the mantle 73. The mantle 73 and the cone cape 74 constitute a coarse crushing means.

The cone cape 74 is suspended from a holding ring 76 through a suspending metal member 75, and the holding ring 76 has attached thereto pressure applying means 77 of the hydraulic or spring type. The pressure applying means 77 has the function of adjusting the gap between the cone cape 74 and the mantle 73 and applying pressure to the crushed material descending from the mantle 73 to the cone cape 74. The cone cape 74 is split into sections peripherally thereof, so as to be able to move in a direction away from the mantle 73 when foreign matter, such as metal pieces, that might be mingled in with the material fed to the plant to be pulverized might be bitten by the cone cape 74, to thereby avoid damage to the plant.

Operation of the embodiment shown in FIG. 10 will be described. The vertical shaft 71, which is located in eccentric relation to the center axis of the base 51, revolves in orbiting movement about the center 51b of the vertical shaft as the base 51 rotates. This permits the mantle 73 rotatably supported by the vertical shaft 71 to revolve in orbiting movement about the shaft 71.

Since the cone cape 74 is mounted in such a manner that its center coincides with the center 51b of the base 51, the gap between the mantle 73 and the cone cape 74 undergoes changes from one minute to the next as the mantle 73 moves in orbiting movement, when viewed from some specific position. The mantle 73 mostly moves in orbiting movement and rarely moves about its own axis because of the resistance offered by the particles of material 6 to be crushed that are held between the mantle 73 and the cone cape 74. This means that only a little relative sliding movement takes place between the mantle 73 and the material 6 to be pulverized and that pressure is largely relied in performing crushing. Thus wear on the mantle 73 can be minimized.

Figure 11:
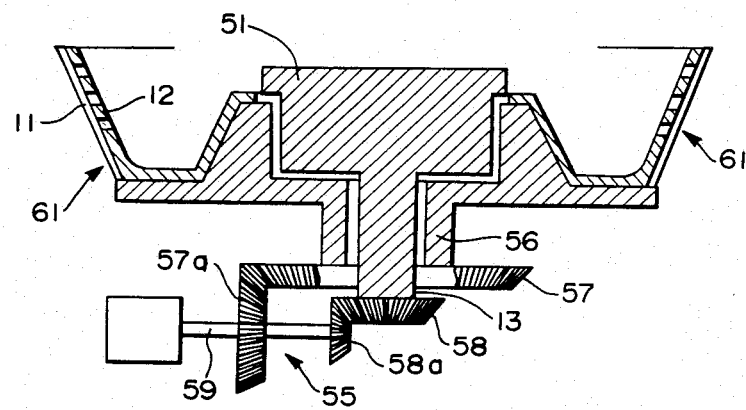
FIG. 11 is a sectional elevation view of the double drive means used in the present invention.

In the second and third embodiments described hereinabove, the base 51 and the annular container 61 are formed as a unitary structure. However, they may be formed as separate entities and double drive means 55 may be provided as shown in FIG. 11, in which the numeral 56 designates a support shaft for the annular container 61 having a bevel gear 57 secured to its end. The rotary shaft 13 for the base 51 has a bevel gear 58 secured to its end. Bevel gears 57a and 58a adapted to mesh with the bevel gears 57 and 58 are secured to a drive shaft 59, and their gear ratio is set in such a manner that a desired number of revolutions may be given to each of the base 51 and the annular container 61.

By virtue of the aforesaid construction, it is possible to drive the base 51 and the annular container 61 at different rates of revolutions by a single drive force, to enable coarse crushing and fine crushing to be achieved with a high degree of efficiency.

Figure 12:
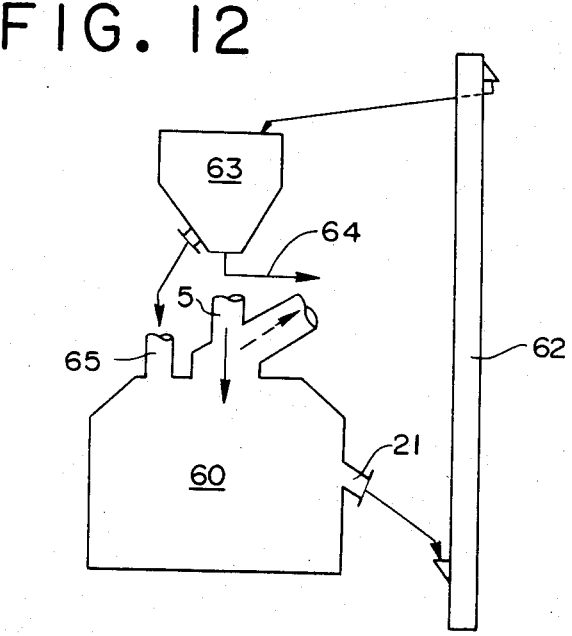
FIG. 12 is a flowsheet view of a pulverizing plant having incorporated therein the embodiment of the present pulverizing mill apparatus as shown in FIG. 7.

As shown in FIGS. 7 and 10, the returned particle feeding chute 65 may be mounted in a manner to extend through the upper portion of the casing 19 and face the fine crushing means. The pulverizing mill apparatus 60 provided with such chute 65 can be incorporated in a crushing plant system as shown in FIG. 12.

In the pulverizing mill apparatus 60 according to the invention (FIG. 12), the particles of material to be pulverized are fed through the chute 5 and are ejected through the chute 21 and conveyed by a bucket elevator 62 to a classifying machine 63. Fine particles classified by the classifying machine 63 are transported to the next station via 64 and coarse particles are returned through the chute 65 to the pulverizing mill apparatus 60.

It thus will be seen that there is provided a pulverizing mill apparatus which achieves the various objects of the invention, and which is well adapted to meet the conditions of practical use. As various alternatives within the scope of the present invention will occur to those skilled in the art, besides those alternatives, equivalents and embodiments elucidated supra, and shown in the drawings, it will be understood that the invention is not limited to these modifications but extends to the full range of equivalents, both functional and structural, and is only limited by the scope of the claims appended hereto and equivalents thereof.

We claim:

1. A pulverizing mill apparatus comprising:
    a base rotatable with a vertical rotary shaft;
    an annular rotary container having an outer inclined side wall of substantially inverted frustoconical shape, said container being located at the outer periphery of said base, said inclined side wall being formed with a plurality of linear slits for discharging therethrough particles of pulverized material, each of said slits having an opening of a width smaller than the size of the members of the grinding media;
    a fixed cover secured to a machine frame and arranged in a manner to enclose an upper portion of said annular rotary container, said fixed cover having a plurality of guide vanes attached to its inner surface;
    grinding media for the pulverizing of coarse material, said grinding media being contained in said annular rotary container;
    said container also including conical pulverizing means operative to perform pulverizing of material to be pulverized by the circulatory behavior of said grinding media, said conical pulverizing means being concentrically disposed within said outer inclined side wall;
    coarse crushing means comprising at least one roller arranged to press against an upper surface of said base serving as a crushing tray; and
    a casing secured to said machine frame to enclose said pulverizing means and said coarse crushing means.

2. A pulverizing mill apparatus as claimed in claim 1, wherein said base and said annular rotary container are formed as a unitary structure.

3. A pulverizing mill apparatus as claimed in claim 1, wherein said base is capable of relative rotation with respect to said annular rotary container.

4. A pulverizing mill apparatus as claimed in claim 1, wherein said base and said annular rotary container are capable of rotation relative to each other and said base and said annular rotary container are driven for rotation at different rates of revolution by double drive means.

5. A pulverizing mill apparatus as claimed in claim 1, further comprising a returned particles introducing chute, said chute extending through said casing.

6. The pulverizing mill apparatus as claimed in claim 1, wherein the linear slits are curved and juxtaposed in parallel, and in a concentric orientation relative to the periphery of the inclined side wall of the rotary container.

7. The pulverizing mill apparatus as claimed in claim 6, wherein the linear slits are arranged in spaced apart groups of slits, in the inclined side wall of the rotary container.

8. The pulverizing mill apparatus as claimed in claim 1, wherein each of the guide vanes attached to the fixed cover is curved.

9. The pulverizing mill apparatus as claimed in claim 1, wherein the guide vanes are of a vortical form.

10. The pulverizing mill apparatus as claimed in claim 1, wherein the charge of grinding media comprises steel balls.

11. A pulverizing mill apparatus comprising:

a base rotatable with a vertical rotary shaft;

an annular rotary container having an outer inclined side wall of substantially inverted frustoconical shape, said container being located at the outer periphery of said base, said inclined side wall being formed with a plurality of linear slits for discharging therethrough particles of pulverized material, each of said slits having an opening of a width smaller than the size of the members of the grinding media;

a fixed cover secured to a machine frame and arranged in a manner to enclose an upper portion of said annular rotary container, said fixed cover having a plurality of guide vanes attached to its inner surface;

grinding media for the pulverizing of coarse material, said grinding media being contained in said annular rotary container;

said container also including conical pulverizing means operative to perform pulverizing of material to be pulverized by the circulatory behavior of said grinding media, said conical pulverizing means being concentrically disposed within said outer inclined side wall;

coarse crushing means comprising a mantle rotatably supported by a vertical shaft secured to said base in eccentric relation;

a cone cape arranged in a manner to enclose said mantle; and a casing secured to said machine frame to enclose said pulverizing means and said coarse crushing means.

12. A pulverizing mill apparatus as claimed in claim 11, further comprising double drive means for driving said base and said annular rotary container at different rates of revolution.

13. A pulverizing mill apparatus as claimed in claim 11, further comprising a returned particles introducing chute, said chute extending through said casing.

14. The pulverizing mill apparatus as claimed in claim 11, wherein the linear slits are curved and juxtaposed in parallel and in a concentric orientation relative to the periphery of the inclined side wall of the rotary container.

15. The pulverizing mill apparatus as claimed in claim 14, wherein the linear slits are arranged in spaced apart groups of slits, in the inclined side wall of the rotary container.

16. The pulverizing mill apparatus as claimed in claim 11, wherein each of the guide vanes attached to the fixed cover is curved.

17. The pulverizing mill apparatus as claimed in claim 11, wherein the guide vanes are of a vortical form.

18. The pulverizing mill apparatus as claimed in claim 11, wherein the charge of grinding media comprises steel balls.

* * * * *